US010336467B2

(12) United States Patent
Greene et al.

(10) Patent No.: US 10,336,467 B2
(45) Date of Patent: *Jul. 2, 2019

(54) AIRCRAFT TURBULENCE DETECTION

(71) Applicant: Safe Flight Instrument Corporation, White Plains, NY (US)

(72) Inventors: Randall A. Greene, White Plains, NY (US); Shawn P. Beyer, New York, NY (US); Robert D. Teter, Hopewell Junction, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,167

(22) Filed: Jul. 11, 2017

(65) Prior Publication Data

US 2017/0305573 A1 Oct. 26, 2017

Related U.S. Application Data

(63) Continuation of application No. 15/143,123, filed on Apr. 29, 2016, now Pat. No. 9,701,422, which is a
(Continued)

(51) Int. Cl.
*B64D 45/04* (2006.01)
*G07C 5/08* (2006.01)
(Continued)

(52) U.S. Cl.
CPC ............. *B64D 45/04* (2013.01); *B64D 43/00* (2013.01); *B64D 45/00* (2013.01); *G07C 5/0808* (2013.01);
(Continued)

(58) Field of Classification Search
None
See application file for complete search history.

(56) References Cited

U.S. PATENT DOCUMENTS 3,291,421 A 12/1966 Krame et al.
3,665,465 A 5/1972 Miller
(Continued)

FOREIGN PATENT DOCUMENTS

EP 1 843 127 10/2007
FR 2 892 503 4/2007
(Continued)

OTHER PUBLICATIONS

Cashman et al., "Operational Use of Angle of Attack on Modern Commercial Jet Airplanes," Dec. 31, 2012, 7 pages.
(Continued)

*Primary Examiner* — Laura N Nguyen
(74) *Attorney, Agent, or Firm* — Morrison & Foerster LLP

(57) ABSTRACT

A warning method for an aircraft includes receiving a first parameter indicative of an aircraft's flight path, calculating a stable approach value based on the first parameter, receiving a second parameter indicative of the aircraft's turbulence, calculating a turbulence factor based on the second parameter, calculating a safe landing value based on the stable approach value and the turbulence factor, comparing the safe landing value to a threshold value, and providing an aircraft warning when the safe landing value fails to meet the threshold value.

20 Claims, 3 Drawing Sheets

Related U.S. Application Data continuation of application No. 15/056,989, filed on Feb. 29, 2016, now abandoned.

(60) Provisional application No. 62/190,177, filed on Jul. 8, 2015.

(51) Int. Cl.
| | |
|---|---|
| *B64D 45/00* | (2006.01) |
| *B64D 43/00* | (2006.01) |
| *G08G 5/00* | (2006.01) |
| *G08G 5/02* | (2006.01) |

(52) U.S. Cl.
CPC ......... *G08G 5/0021* (2013.01); *G08G 5/0091* (2013.01); *G08G 5/025* (2013.01); *B64D 2045/008* (2013.01)

(56) References Cited

U.S. PATENT DOCUMENTS

| | | | |
|---|---|---|---|
| 3,691,356 A | 9/1972 | Miller | |
| 3,712,122 A | 1/1973 | Harris et al. | |
| 3,805,033 A | 4/1974 | Manke et al. | |
| 3,934,221 A | 1/1976 | Bateman et al. | |
| 3,936,797 A | 2/1976 | Andresen, Jr. | |
| 3,994,455 A | 11/1976 | Simpson | |
| 4,092,716 A | 5/1978 | Berg et al. | |
| 4,319,218 A | 3/1982 | Bateman | |
| 4,373,184 A | 2/1983 | Lambregts | |
| 4,431,994 A | 2/1984 | Gemin | |
| 4,536,843 A | 8/1985 | Lambregts | |
| 4,551,723 A | 11/1985 | Paterson | |
| 4,675,823 A | 6/1987 | Noland | |
| 4,764,872 A | 9/1988 | Miller | |
| 5,020,747 A | 6/1991 | Orgun et al. | |
| 5,031,102 A | 7/1991 | Robbins et al. | |
| 5,038,141 A | 8/1991 | Grove | |
| 5,187,478 A | 2/1993 | Grove | |
| 5,220,322 A | 6/1993 | Bateman et al. | |
| 5,402,116 A | 3/1995 | Ashley | |
| 5,406,487 A | 4/1995 | Tanis | |
| 5,781,126 A | 7/1998 | Paterson et al. | |
| 5,901,927 A | 5/1999 | Ho | |
| 6,121,899 A | 9/2000 | Theriault | |
| 6,186,447 B1 | 2/2001 | Virdee | |
| 6,216,064 B1 | 4/2001 | Johnson et al. | |
| 6,422,517 B1 | 7/2002 | DeWitt et al. | |
| 6,462,703 B2 | 10/2002 | Hedrick | |
| 6,507,289 B1 | 1/2003 | Johnson et al. | |
| 6,711,479 B1 | 3/2004 | Staggs | |
| 6,761,336 B2 | 7/2004 | DeWitt et al. | |
| 6,845,304 B1 | 1/2005 | Young | |
| 6,940,427 B2 | 9/2005 | Bateman | |
| 6,999,023 B2 | 2/2006 | Block | |
| 7,088,264 B2 | 8/2006 | Riley | |
| 7,725,220 B2 | 5/2010 | Petrich et al. | |
| 8,027,756 B2 | 9/2011 | Davis et al. | |
| 8,126,600 B2 | 2/2012 | Conner et al. | |
| 8,175,763 B2 | 5/2012 | Yamane et al. | |
| 8,321,071 B2 | 11/2012 | Klooster | |
| 8,478,458 B2 | 7/2013 | Faurie et al. | |
| 8,494,693 B2 | 7/2013 | Murphy | |
| 8,630,756 B2 | 1/2014 | Fleiger-Holmes et al. | |
| 8,660,722 B2 | 2/2014 | Dumoulin et al. | |
| 8,723,695 B2 | 5/2014 | Bourret et al. | |
| 8,788,128 B1 | 7/2014 | McCusker | |
| 8,831,799 B1 | 9/2014 | Levine et al. | |
| 8,903,572 B1 | 12/2014 | Hagelin | |
| 2001/0052562 A1 | 12/2001 | Ishihara et al. | |
| 2002/0030607 A1 | 3/2002 | Conner et al. | |
| 2002/0075171 A1 | 6/2002 | Kuntman et al. | |
| 2002/0077731 A1 | 6/2002 | Hilb | |
| 2003/0016145 A1* | 1/2003 | Bateman | B64D 43/02 340/967 |
| 2003/0093187 A1 | 5/2003 | Walker | |
| 2003/0206119 A1 | 11/2003 | Riley | |
| 2004/0057177 A1 | 3/2004 | Glahn | |
| 2004/0070521 A1 | 4/2004 | Greene | |
| 2006/0041345 A1 | 2/2006 | Metcalf | |
| 2006/0052912 A1 | 3/2006 | Meunier | |
| 2006/0195235 A1* | 8/2006 | Ishihara | G01C 23/00 701/16 |
| 2006/0220921 A1 | 10/2006 | Foucart | |
| 2006/0271249 A1 | 11/2006 | Testrake et al. | |
| 2007/0239326 A1 | 10/2007 | Johnson et al. | |
| 2008/0243316 A1 | 10/2008 | Sacle et al. | |
| 2009/0138144 A1 | 5/2009 | Flannigan et al. | |
| 2009/0207047 A1 | 8/2009 | Ross, III | |
| 2009/0262008 A1 | 10/2009 | Thomas et al. | |
| 2010/0090867 A1 | 4/2010 | Christophe | |
| 2011/0029158 A1 | 2/2011 | Klooster | |
| 2011/0077858 A1 | 3/2011 | Coulmeau | |
| 2011/0098967 A1 | 4/2011 | Khial | |
| 2011/0199253 A1 | 8/2011 | Delga et al. | |
| 2011/0251740 A1* | 10/2011 | Gomez Ledesma | G05D 1/101 701/8 |
| 2011/0276217 A1 | 11/2011 | Sim | |
| 2012/0053760 A1 | 3/2012 | Burnside et al. | |
| 2012/0056760 A1 | 3/2012 | Bourret et al. | |
| 2012/0095625 A1 | 4/2012 | Ishihara et al. | |
| 2012/0191273 A1 | 7/2012 | Jacobs et al. | |
| 2012/0265374 A1 | 10/2012 | Yochum | |
| 2012/0316706 A1 | 12/2012 | Guedes | |
| 2013/0030614 A1 | 1/2013 | Ding | |
| 2013/0245982 A1 | 9/2013 | Buchanan et al. | |
| 2013/0274964 A1 | 10/2013 | Jesse et al. | |
| 2014/0074326 A1* | 3/2014 | Pereira | G01W 1/00 701/14 |
| 2014/0090471 A1 | 4/2014 | Hsu | |
| 2014/0129058 A1* | 5/2014 | Elahi | G08G 5/0021 701/16 |
| 2014/0172202 A1 | 6/2014 | Greene | |
| 2014/0229056 A1 | 8/2014 | Catt | |
| 2015/0120098 A1 | 4/2015 | Catalfamo et al. | |
| 2015/0120099 A1 | 4/2015 | Herbert et al. | |
| 2015/0123821 A1 | 5/2015 | Greene | |

FOREIGN PATENT DOCUMENTS

| | | |
|---|---|---|
| FR | 2 956 491 | 8/2011 |
| FR | 2 964 466 | 3/2012 |
| GB | 2 300 167 | 10/1996 |

OTHER PUBLICATIONS

Supplementary European Search Report for EP 13897022.3, dated Jun. 21, 2017, 3 pages.

International Search Report and Written Opinion for PCT/US2013/68580, dated Jul. 11, 2014, 14 pages.

Jeff Scott, "Angle of Attack and Pitch Angle," Feb. 29, 2004, accessed May 24, 2016. <http://www.aerospaceweb.org/question/aerodynamics/q0165.shtml>.

\* cited by examiner

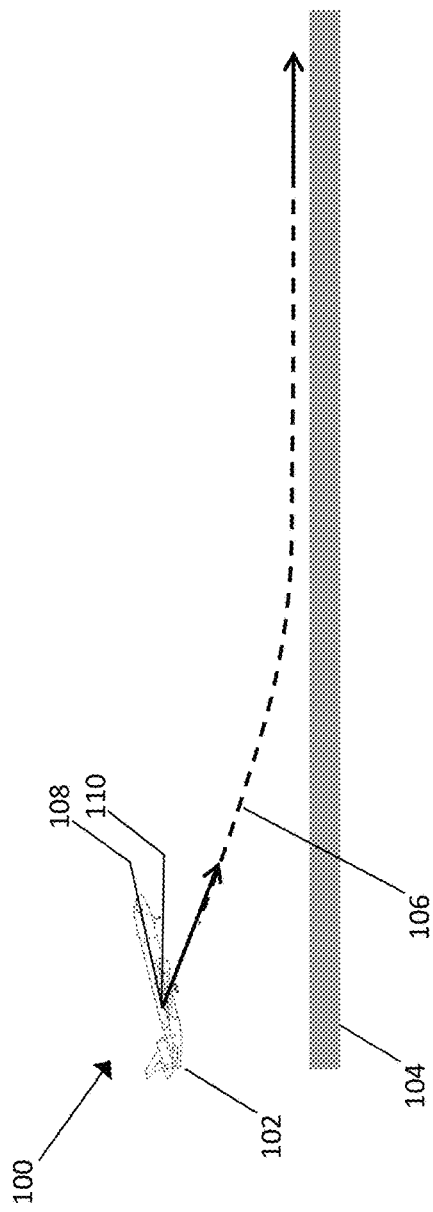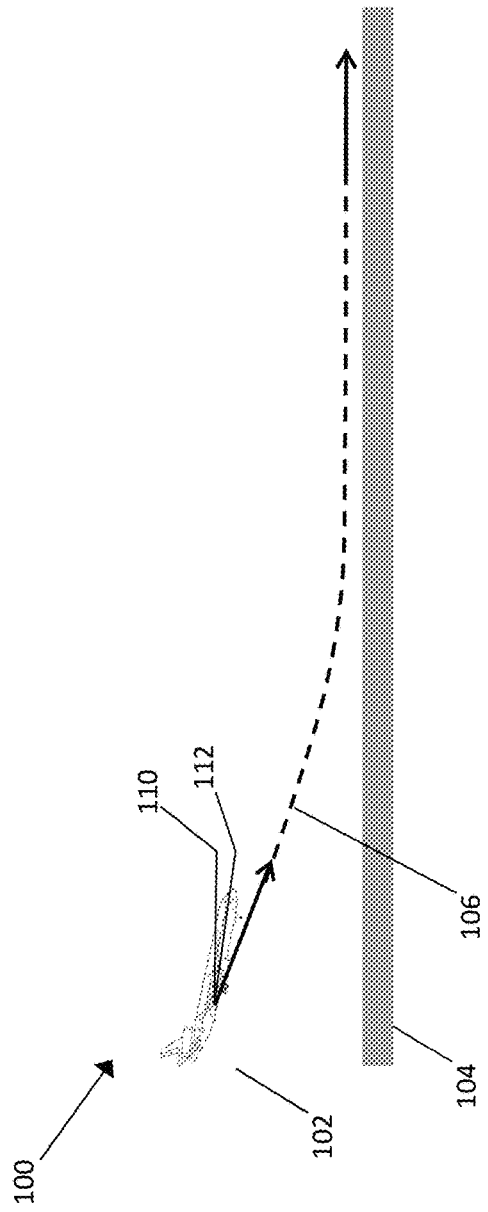

AIRCRAFT TURBULENCE DETECTION

CROSS REFERENCE TO RELATED APPLICATIONS

This application is a continuation of U.S. patent application Ser. No. 15/143,123 filed Apr. 29, 2016, which is a continuation of Ser. No. 15/056,989 filed Feb. 29, 2016, which claims the benefit of U.S. Provisional Application No. 62/190,177 filed Jul. 8, 2015. The disclosures of which are incorporated herein in their entireties.

FIELD OF THE DISCLOSURE

This disclosure generally relates to systems and methods for flying an aircraft. More particularly, this disclosure relates to systems and methods for monitoring an aircraft's turbulent environment and providing instructions or warnings to the aircraft's crew based on the monitored turbulent environment.

BACKGROUND

Turbulence is an unstable flight condition with rapid variations in either flight path or attitude. It can reduce an aircraft's margins of control and stability and hazardous levels can impart significant "g" loads on an airframe.

Turbulence detection is useful during approach to landing while the flight crew attempts to keep the aircraft on a stabilized flight path. Unstabilized approaches can lead to dangerous landing conditions such as tailstrikes, hard landings, long landings, and bounced landings.

Systems and methods are available for providing "go-around" instructions to an aircraft crew if an unsafe landing is being attempted. Traditionally, aircraft warnings are based on an aircraft's vertical speed and height above the ground, but an aircraft's turbulent environment is not considered.

SUMMARY

This disclosure relates to methods and systems for monitoring an aircraft's turbulent environment and providing instructions or warnings to the aircraft's crew based on the monitored turbulent environment. Advantageously, the systems and methods may reduce dangerous landing conditions such as tailstrikes, hard landings, long landings, and bounced landings.

In one embodiment, a warning method for an aircraft includes receiving a first parameter indicative of an aircraft's flight path, calculating a stable approach value based on the first parameter, receiving a second parameter indicative of the aircraft's turbulence, calculating a turbulence factor based on the second parameter, calculating a safe landing value based on the stable approach value and the turbulence factor, comparing the safe landing value to a threshold value, and providing an aircraft warning when the safe landing value fails to meet the threshold value.

In some embodiments, the first parameter includes the aircraft's vertical speed and the aircraft's height above the ground.

In some embodiments, the second parameter includes the aircraft's pitch rate and the aircraft's vertical acceleration rate. In some embodiments, the aircraft's pitch rate includes a frequency of a pitch's oscillation. In some embodiments, the aircraft's vertical acceleration rate includes a maximum vertical acceleration over a period of time.

In some embodiments, the second parameter includes a frequency of a vertical acceleration rate of the aircraft. In some embodiments, the second parameter includes an acceleration of the aircraft about an axis, a rate of change of an acceleration of the aircraft about an axis, a yaw rate of the aircraft, or a roll rate of the aircraft.

In some embodiments, calculating the safe landing value includes normalizing the stable approach value and the turbulence factor. In some embodiments, calculating the safe landing value includes adding the stable approach value and the turbulence factor or multiplying the stable approach value and the turbulence factor.

In some embodiments, the aircraft warning includes a go-around instruction, tailstrike warning, a hard landing warning, a long landing warning, or a bounce landing warning.

In one embodiment, an aircraft warning system includes a first module that receives multiple first parameters indicative of an aircraft's flight path, a second module that calculates a stable approach value based on the multiple first parameters, a third module that receives multiple second parameters indicative of the aircraft's turbulence, a fourth module that calculates a turbulence factor based on the multiple second parameters, a fifth module that calculates a safe landing value based on the stable approach value and the turbulence factor, a sixth module that compares the safe landing value to a threshold value, and a seventh module that provides an aircraft warning when the safe landing value fails to meet the threshold value.

In some embodiments, the multiple first parameters include the aircraft's vertical speed and the aircraft's height above the ground.

In some embodiments, the multiple second parameters include the aircraft's pitch rate and the aircraft's vertical acceleration rate. In some embodiments, the aircraft's pitch rate includes a frequency of a pitch's oscillation. In some embodiments, the aircraft's vertical acceleration rate includes a maximum vertical acceleration over a period of time.

In some embodiments, the second parameter includes a frequency of a vertical acceleration rate of the aircraft. In some embodiments, the second parameter includes an acceleration of the aircraft about an axis, a rate of change of an acceleration of the aircraft about an axis, a yaw rate of the aircraft, or a roll rate of the aircraft.

In some embodiments, the fifth module normalizes the stable approach value and the turbulence factor. In some embodiments, the fifth module adds the stable approach value and the turbulence factor or multiplies the stable approach value and the turbulence factor.

In some embodiments, the aircraft warning includes a go-around instruction, tailstrike warning, a hard landing warning, a long landing warning, or a bounce landing warning.

In one embodiment, a warning method for an aircraft includes receiving multiple first parameters indicative of an aircraft's flight path, calculating a stable approach value based on the multiple first parameters, receiving multiple second parameters indicative of the aircraft's turbulence, calculating a turbulence factor based on the multiple second parameters, calculating a safe landing value based on the stable approach value and the turbulence factor, comparing the safe landing value to a threshold value, and providing an aircraft warning when the safe landing value fails to meet the threshold value.

In some embodiments, the multiple first parameters include the aircraft's vertical speed and the aircraft's height above the ground. In some embodiments, the multiple second parameters include the aircraft's pitch rate and the aircraft's vertical acceleration rate.

In one embodiment, a warning method for an aircraft includes receiving a stable approach value, receiving a parameter indicative of the aircraft's turbulence, calculating a turbulence factor based on the parameter, calculating a safe landing value based on the stable approach value and the turbulence factor, comparing the safe landing value to a threshold value, and providing an aircraft warning when the safe landing value fails to meet the threshold value. In some embodiments, the stable approach value is a glide slope signal. In some embodiments, the turbulence factor is a glide slope deviation. In some embodiments, the safe landing value is substituted for a stable approach value in a bus (e.g., an ARINC bus) before an error is detected. Exemplary systems and methods of substituting signals in a bus are disclosed in U.S. patent application Ser. No. 14/450,165, the content of which is incorporated herein in its entirety.

BRIEF DESCRIPTION OF THE DRAWINGS

FIG. 1A depicts an aircraft during approach to a runway, in accordance with an embodiment.

FIG. 1B depicts an aircraft during a turbulence-impacted approach to a runway, in accordance with an embodiment.

DETAILED DESCRIPTION

In the following description of embodiments, reference is made to the accompanying drawings which form a part hereof, and in which it is shown by way of illustration specific embodiments in which the claimed subject matter may be practiced. It is to be understood that other embodiments may be utilized and structural changes may be made without departing from the scope of the claimed subject matter.

In some embodiments, an aircraft's turbulent environment is monitored and warnings or instructions are given to the aircraft's crew based on the monitored turbulent environment. Advantageously, this may reduce dangerous landing conditions such as tailstrikes, hard landings, long landings, and bounced landings.

FIG. 1A depicts an aircraft 102 during approach to a runway 104, in accordance with an embodiment. FIG. 1A illustrates a stable approach, with the aircraft 102 following a flight path 106. Aircraft 102 has an appropriate pitch for a stable approach and landing. As used herein, an aircraft's pitch can be understood to include the angle between a reference line (for example, the chord line, identified as 108 in FIG. 1A) of the aircraft and the horizontal 110. Traditionally, a stable flight path is determined by vertical velocity and height above the ground, and a warning is issued when an aircraft deviates from the stable flight path.

FIG. 1B depicts aircraft 102 during a turbulence-impacted approach to runway 104, in accordance with an embodiment. In this figure, turbulence has caused aircraft 102 to pitch down, depicted by the chord line 112 below the horizontal 110. To maintain the correct approach path, the crew of aircraft 102 must correct the pitch while also adjusting thrust and control surfaces so that the vertical velocity and height follow a stable flight path.

Thus, the effect of turbulence distracts the crew from the already complicated approach procedure, thereby reducing performance margin and increasing the risk of tailstrikes, hard landings, long landings, bounced landings, and other accidents. However, because the crew in FIG. 1B manages to maintain the aircraft on a stable flight path, no warning may be given. If the effects of turbulence continue, the aircraft may deviate from the stable flight path. At that time, a go-around maneuver may be impossible and an accident inevitable.

Figure 2:
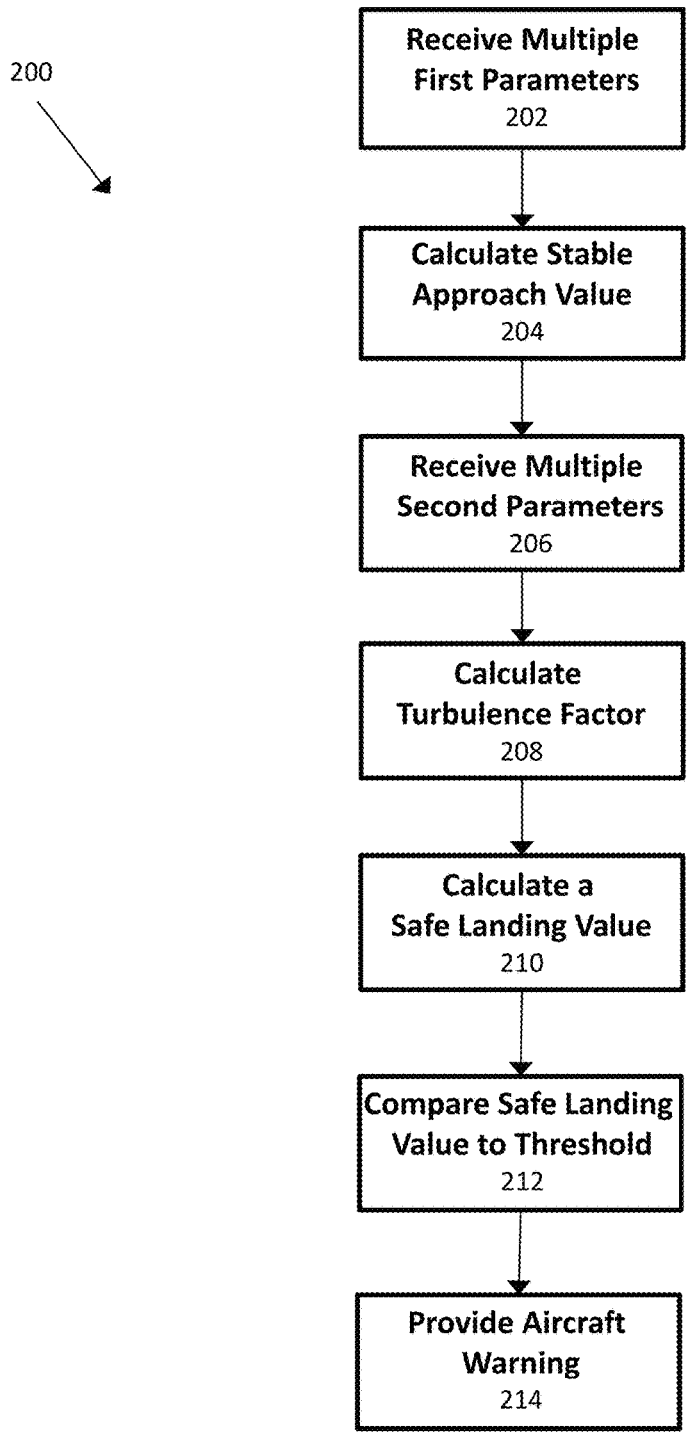
FIG. 2 depicts a warning method for an aircraft, in accordance with an embodiment.

In some embodiments, a safe landing value is calculated based on a stable approach value and a turbulence factor. FIG. 2 depicts a warning method 200 for an aircraft, in accordance with an embodiment. Method 200 may reduce dangerous landing conditions such as tailstrikes, hard landings, long landings, and bounced landings.

Method 200 includes receiving a first parameter indicative of an aircraft's flight path 202. In some embodiments, receiving a first parameter comprises receiving multiple first parameters. In some embodiments, the first parameter includes the aircraft's vertical speed and the aircraft's height above the ground.

Method 200 includes calculating a stable approach value based on the first parameter 204. Traditionally, the stable approach value may be compared to a threshold. For example, a measured vertical air speed may be compared to a vertical speed limit. In other traditional examples, deviations of angle of attack and/or airspeed from a nominal value, or deviations from the glide slope of an instrument landing system, are used.

Method 200 includes receiving a second parameter indicative of the aircraft's turbulence 206. Advantageously, this may represent the actual turbulent environment experienced by the aircraft, rather than estimating a turbulent environment based on a radar-based turbulent detection. The actual turbulent environment can give a direct measure of the impact on performance margin and provide improved guidance for warnings and instructions.

In some embodiments, receiving a second parameter comprises receiving multiple second parameters. In some embodiments, the second parameter includes the aircraft's pitch rate and the aircraft's vertical acceleration rate. In some embodiments, the aircraft's pitch rate includes a frequency of a pitch's oscillation, such as the number of pitch "maximums" during a certain time period, for example. In some embodiments, the aircraft's vertical acceleration rate includes a maximum vertical acceleration over a period of time, such as the maximum vertical acceleration over one second, for example.

In some embodiments, the second parameter includes a frequency of a vertical acceleration rate of the aircraft. In some embodiments, the second parameter includes an acceleration of the aircraft about an axis or a rate of change of an acceleration of the aircraft about an axis. In some embodiments, the second parameter includes a yaw rate or a roll rate.

Method 200 includes calculating a turbulence factor based on the second parameter 208. In some embodiments, the turbulence factor is calculated using $TF = k_{\dot{a}_v} abs(\dot{a}_v) + k_{\dot{\theta}} abs(\dot{\theta})$ where:

TF is the turbulence factor, $k_{\dot{a}_v}$ is the vertical acceleration rate gain, $\dot{a}_v$ is the vertical acceleration rate, $k_{\dot{\theta}}$ is the pitch rate gain, and $\dot{\theta}$ is the pitch rate.

In some embodiments, the vertical acceleration rate is a measured value or a filtered or moving average. In some embodiments, the pitch rate is a measured value or a filtered or moving average.

Method 200 includes calculating a safe landing value based on the stable approach value and the turbulence factor 210. In some embodiments, calculating the safe landing value includes normalizing the stable approach value and the turbulence factor. In some embodiments, normalizing the stable approach value and the turbulence factor comprises adjusting one value so that it has the same dimensions as the other value or adjusting both values so that they have the same dimensions.

In some embodiments, calculating the safe landing value includes adding the stable approach value and the turbulence factor or multiplying the stable approach value and the turbulence factor. In some embodiments, the safe landing value is calculated using $SLV=V_s+TF$ or $SLV=TF \times V_s$, where:

SLV is the safe landing value,
TF Is the turbulence factor, and
$V_s$ is the sink rate with positive being in the descending direction.

In some embodiments, additional flight-specific parameters may be incorporated into the calculation of the safe landing value. For example, a safe landing value may also be based on the type of airplane, the experience of the crew, weather conditions, a destination airport, the weight of the airplane and cargo, or flap/slat position of the airplane.

In some embodiments, method 200 includes applying a lag or moving averages (e.g., a moving average is the average value of a parameter over a predetermined time period) to factor out unsteady turbulence factors. In some embodiments, a first order damping or a low pass filter is applied to the parameter to smooth out unsteady, high frequency variations. In some embodiments, the damping or low pass filter is calculated using $$x(t) = \frac{k}{s\tau + 1} u(t)$$

where:
x(t) is the response of the system,
k is the gain of the system,
s is the laplace variable,
t is the time constant of the system, and
u(t) is the input to the system.

Method 200 includes comparing the safe landing value to a threshold value 212. In some embodiments, the threshold value is a static threshold value. In some embodiments, the threshold value changes as a function of height above touchdown. In some embodiments, the threshold is based on previous flight data in order to determine acceptable and unacceptable values.

Method 200 includes providing an aircraft warning when the safe landing value fails to meet the threshold value 214. In some embodiments, the aircraft warning includes a go-around instruction, tailstrike warning, a hard landing warning, a long landing warning, or a bounce landing warning.

In some embodiments, the turbulence factor calculated above in step 208 is used in a non-landing situation. During cruising, for example, a turbulence warning alerts the flight crew to decelerate to the turbulence penetration speed. Like the approach case discussed above, a similar algorithm detects turbulence during cruise using aircraft speeds, accelerations and their rates, and attitude rates and then applies a turbulence factor to provide a warning to the crew or provide flight instructions.

Figure 3:
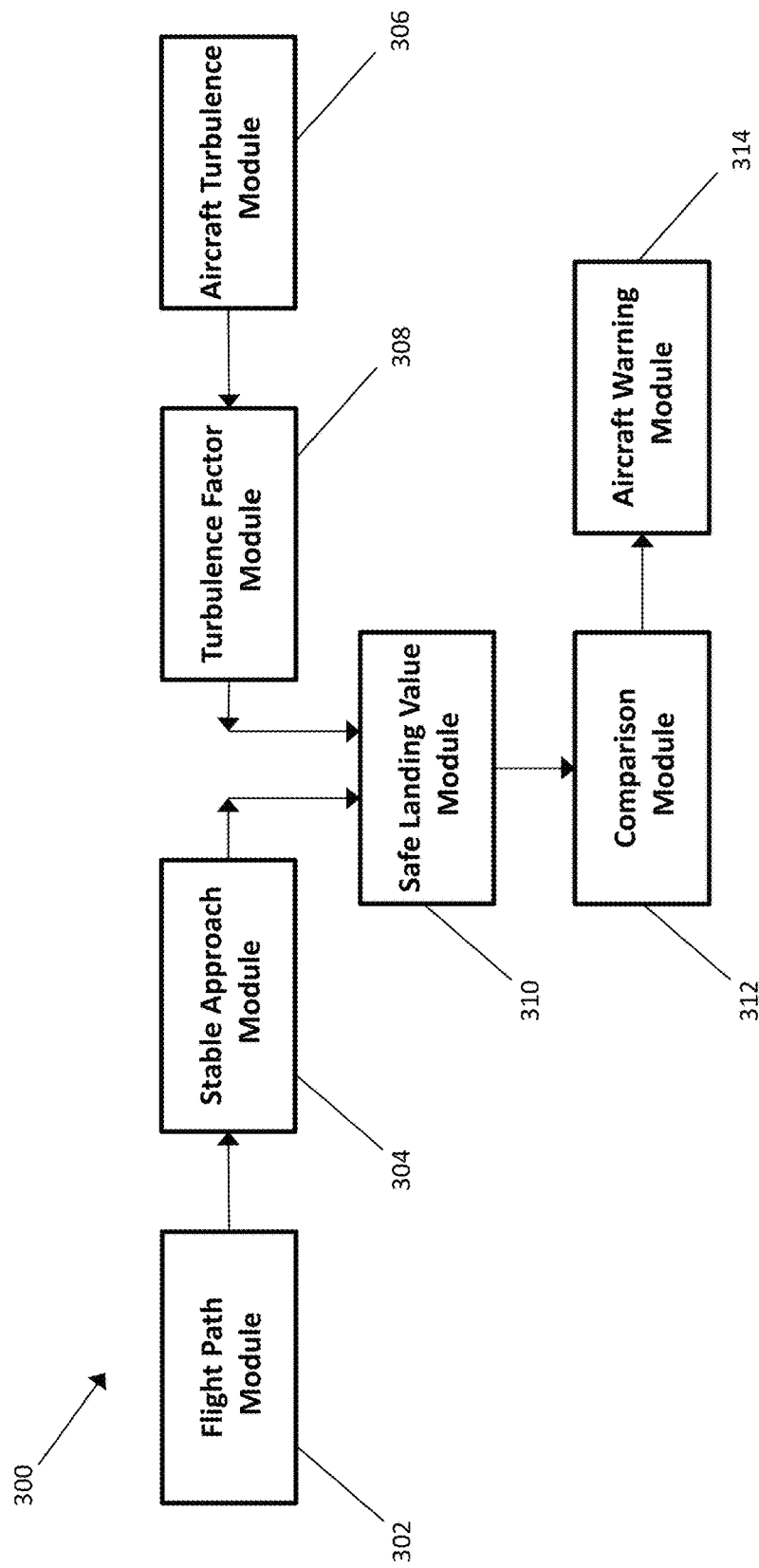
FIG. 3 depicts an aircraft warning system, in accordance with an embodiment.

FIG. 3 depicts an aircraft warning system 300, in accordance with an embodiment. System 300 may reduce dangerous landing conditions such as tailstrikes, hard landings, long landings, and bounced landings.

Aircraft warning system 300 includes a flight path module 302 that receives a first parameter indicative of the aircraft's flight path. In some embodiments, flight path module 302 receives multiple first parameters indicative of the aircraft's flight path. In some embodiments, the first parameter includes the aircraft's vertical speed and the aircraft's height above the ground. In some embodiments, the first parameter is received from sensors on the aircraft, such as an altimeter, an airspeed indicator, a seismometer, an accelerometer, and a gyroscope, for example.

Aircraft warning system 300 includes a stable approach value module 304 that calculates a stable approach value based on the first parameter.

Aircraft warning system 300 includes an aircraft turbulence module 306 that receives a second parameter indicative of the aircraft's turbulence. In some embodiments, aircraft turbulence module 306 receives multiple second parameters indicative of the aircraft's turbulence.

In some embodiments, the second parameter includes the aircraft's pitch rate and the aircraft's vertical acceleration rate. In some embodiments, the aircraft's pitch rate includes a frequency of a pitch's oscillation. In some embodiments, the aircraft's vertical acceleration rate includes a maximum vertical acceleration over a period of time. In some embodiments, the second parameter is received from sensors on the aircraft, such as an altimeter, an airspeed indicator, a seismometer, an accelerometer, and a gyroscope, for example.

In some embodiments, the second parameter includes a frequency of a vertical acceleration rate of the aircraft. In some embodiments, the second parameter includes an acceleration of the aircraft about an axis or a rate of change of an acceleration of the aircraft about an axis.

Aircraft warning system 300 includes a turbulence factor module 308 that calculates a turbulence factor based on the second parameter.

Aircraft warning system 300 includes a safe landing value module 310 that calculates a safe landing value based on the stable approach value and the turbulence factor. In some embodiments, the safe landing value module normalizes the stable approach value and the turbulence factor. In some embodiments, normalizing the stable approach value and the turbulence factor comprises adjusting one value so that it has the same dimensions as the other value or adjusting both values so that they have the same dimensions.

In some embodiments, the safe landing value module adds the stable approach value and the turbulence factor or multiplies the stable approach value and the turbulence factor.

Aircraft warning system 300 includes a comparison module 312 that compares the safe landing value to a threshold value.

Aircraft warning system 300 includes an aircraft warning module 314 that provides an aircraft warning when the safe landing value fails to meet the threshold value. In some embodiments, the aircraft warning includes a go-around instruction, tailstrike warning, a hard landing warning, a long landing warning, or a bounce landing warning.

In one embodiment, a warning method for an aircraft includes receiving a stable approach value, receiving a parameter indicative of the aircraft's turbulence, calculating a turbulence factor based on the parameter, calculating a safe landing value based on the stable approach value and the turbulence factor, comparing the safe landing value to a threshold value, and providing an aircraft warning when the safe landing value fails to meet the threshold value. In some embodiments, the stable approach value is a glide slope signal. In some embodiments, the turbulence factor is a glide slope deviation. In some embodiments, the safe landing value is substituted for a stable approach value in a bus (e.g., an ARINC bus) before an error is detected. Exemplary systems and methods of substituting signals in a bus are disclosed in U.S. patent application Ser. No. 14/450,165, the content of which is incorporated herein in its entirety.

The term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions.

One skilled in the relevant art will recognize that many possible modifications and combinations of the disclosed embodiments can be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations can be possible in view of the above teachings. The embodiments were chosen and described to explain the principles of the disclosure and their practical applications, and to enable others skilled in the art to best utilize the disclosure and various embodiments with various modifications as suited to the particular use contemplated.

Further, while this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aircraft warning method comprising:
receiving the aircraft's vertical speed;
receiving, from a motion sensor integrated with the aircraft, at least one of the aircraft's vertical acceleration rate and a rate of change of a parameter indicative of the aircraft's movement about an aircraft axis;
calculating a safe landing value based on the aircraft's vertical speed and at least one of the aircraft's vertical acceleration rate and the rate of change of the parameter;
comparing the safe landing value to a threshold value, wherein the threshold value varies with a height of the aircraft above touchdown; and
providing an aircraft warning when the safe landing value fails to meet the threshold value.

2. The method of claim 1, further comprising applying a filter to at least one of the aircraft's vertical speed, the aircraft's vertical acceleration rate, and the rate of change of the parameter.

3. The method of claim 1, wherein calculating the safe landing value comprises normalizing the aircraft's vertical speed and at least one of the aircraft's vertical acceleration rate and the rate of change of the parameter.

4. The method of claim 3, wherein calculating the safe landing value comprises summing a normalized function of the vertical speed and a normalized function of at least one of vertical acceleration rate and the rate of change of the parameter.

5. The method of claim 1, wherein the aircraft warning comprises a go-around instruction, tailstrike warning, a hard landing warning, a long landing warning, or a bounce landing warning.

6. The method of claim 1, wherein the rate of change of the parameter comprises a rotation rate of the aircraft about the axis.

7. The method of claim 6, wherein the rotation rate of the aircraft about the axis comprises at least one of the aircraft's pitch, the aircraft's yaw rate, and the aircraft's roll rate.

8. The method of claim 1, wherein the rate of change of the parameter comprises the aircraft's acceleration rate about the axis.

9. The method of claim 8, wherein the aircraft's acceleration rate about the axis comprises at least one of the aircraft's pitch acceleration rate, the aircraft's yaw acceleration rate, and the aircraft's roll acceleration rate.

10. The method of claim 1, wherein the threshold value is based on previous flight data.

11. An aircraft warning system comprising:
a first receiver configured to receive the aircraft's vertical speed;
a second receiver configured to receive, from a motion sensor integrated with the aircraft, at least one of the aircraft's vertical acceleration rate and a rate of change of a parameter indicative of the aircraft's movement about an aircraft axis;
a processor configured to
calculate a safe landing value based on the aircraft's vertical speed and at least one of the aircraft's vertical acceleration rate and the rate of change of the parameter,
compare the safe landing value to a threshold value, wherein the threshold value varies with a height of the aircraft above touchdown; and
an alarm configured to provide an aircraft warning when the safe landing value fails to meet the threshold value.

12. The system of claim 11, wherein the processor is further configured to filter at least one of the aircraft's vertical speed, the aircraft's vertical acceleration rate, and the rate of change of the parameter.

13. The system of claim 11, wherein calculating the safe landing value comprises normalizing the aircraft's vertical speed and at least one of the aircraft's vertical acceleration rate and the rate of change of the parameter.

14. The system of claim 13, wherein calculating the safe landing value comprises summing a normalized function of the vertical speed and a normalized function of at least one of vertical acceleration rate and the rate of change of the parameter.

15. The system of claim 11, wherein the aircraft warning comprises a go-around instruction, tailstrike warning, a hard landing warning, a long landing warning, or a bounce landing warning.

16. The system of claim 11, wherein the rate of change of the parameter comprises a rotation rate of the aircraft about the axis.

17. The system of claim 16, wherein the rotation rate of the aircraft about the axis comprises at least one of the aircraft's pitch, the aircraft's yaw rate, and the aircraft's roll rate.

18. The system of claim 11, wherein the rate of change of the parameter comprises the aircraft's acceleration rate about the axis.

19. The system of claim 18, wherein the aircraft's acceleration rate about the axis comprises at least one of the aircraft's pitch acceleration rate, the aircraft's yaw acceleration rate, and the aircraft's roll acceleration rate.

20. The system of claim 11, wherein the threshold value is based on previous flight data.

* * * * *